United States Patent [19]
Su

[11] Patent Number: 5,842,385
[45] Date of Patent: Dec. 1, 1998

[54] HANDLEBAR STEM ASSEMBLY FOR A BICYCLE

[76] Inventor: Chien-Yu Su, No. 54, Jen Ho St., Taiping City, Taichung Hsien, Taiwan

[21] Appl. No.: 827,369

[22] Filed: Mar. 27, 1997

[51] Int. Cl.[6] .................................................. B62K 21/16

[52] U.S. Cl. ........................ 74/551.3; 280/279; 403/351; 403/367; 74/551.1; 74/551.8

[58] Field of Search ............................... 74/551.1–551.8; 280/279, 280; 403/351, 367, 552, 365, 371, 372

[56] References Cited

U.S. PATENT DOCUMENTS

| | | | |
|---|---|---|---|
| 4,726,600 | 2/1988 | Wu | 280/234 |
| 5,404,769 | 4/1995 | Kao | 74/551.3 |
| 5,435,204 | 7/1995 | Marui | 74/551.4 |

Primary Examiner—Vinh T. Luong
Attorney, Agent, or Firm—Bacon & Thomas

[57] ABSTRACT

A handlebar stem assembly includes a handlebar stem, a tubular housing formed on one end portion of the handlebar stem, a passage transversely defined in an inner wall of the tubular housing, and an adjusting member rotatably mounted in the passage such that a handlebar of a bicycle can be eccentrically mounted in the adjusting member.

4 Claims, 11 Drawing Sheets

HANDLEBAR STEM ASSEMBLY FOR A BICYCLE

BACKGROUND OF THE INVENTION

1. Field of the Invention

The present invention relates to a handlebar stem assembly, and more particularly to a handlebar stem assembly for a bicycle.

2. Description of the Related Art

Figure 11:
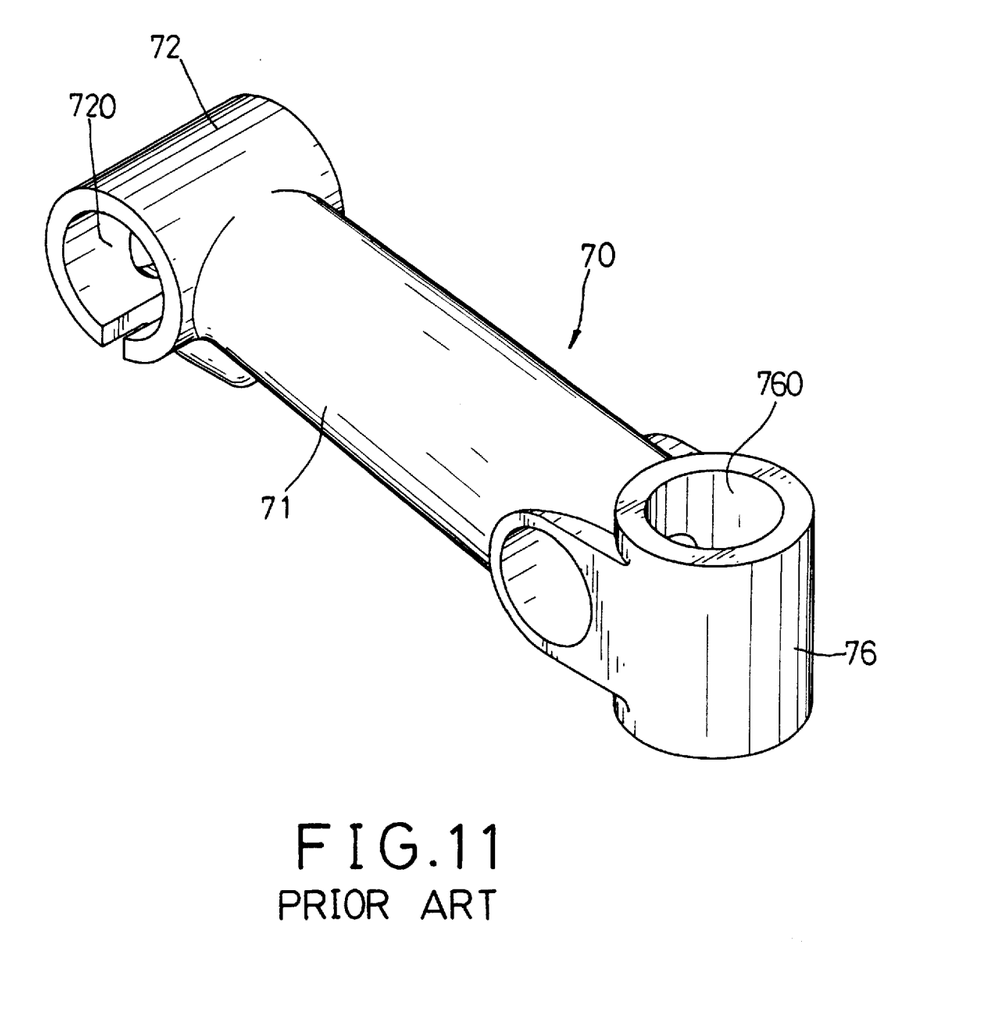
FIG. 11 is a perspective view of a conventional handlebar stem in accordance with the prior art.

For a better understanding of features and benefits of the present invention, reference is made to FIG. 11, illustrating a conventional handlebar stem 70. The conventional handlebar stem 70 comprises a stem 71 having a first end portion forming a first housing 72 with a hole 720 transversely defined therein for receiving a handlebar (not shown), and a second end portion forming a second housing 76 with a hole 760 vertically defined therein for receiving a steerer tube (not shown). The problem with this conventional handlebar stem is that the distance between the handlebar and the steerer tube is fixed and cannot be adjusted. As a result, the handlebar stem 70 assembled with the handlebar and the steerer tube is not suitable for users of different stature, thereby greatly limiting the versatility of the handlebar 70.

The present invention has arisen to mitigate and/or obviate the disadvantage of the conventional handlebar stem.

SUMMARY OF THE INVENTION

In accordance with one aspect of the present invention, there is provided a handlebar stem assembly comprising a handlebar stem, a tubular housing formed on one end portion of the handlebar stem, a passage transversely defined in an inner wall of the tubular housing, and an adjusting member rotatably mounted in the passage such that a handlebar can be eccentrically mounted in the adjusting member.

In accordance with another aspect of the present invention, there is provided a handlebar stem assembly which comprises a handlebar stem, a housing formed on one end portion of the handlebar stem, an oblong passage vertically defined in an inner wall of the housing, and an oblong adjusting block securely received in the oblong passage and eccentrically mounted on an upper portion of a steerer tube.

Further features of the present invention will become apparent from a careful reading of the detailed description with appropriate reference to the accompanying drawings.

DETAILED DESCRIPTION OF THE PREFERRED EMBODIMENTS

Figure 1:
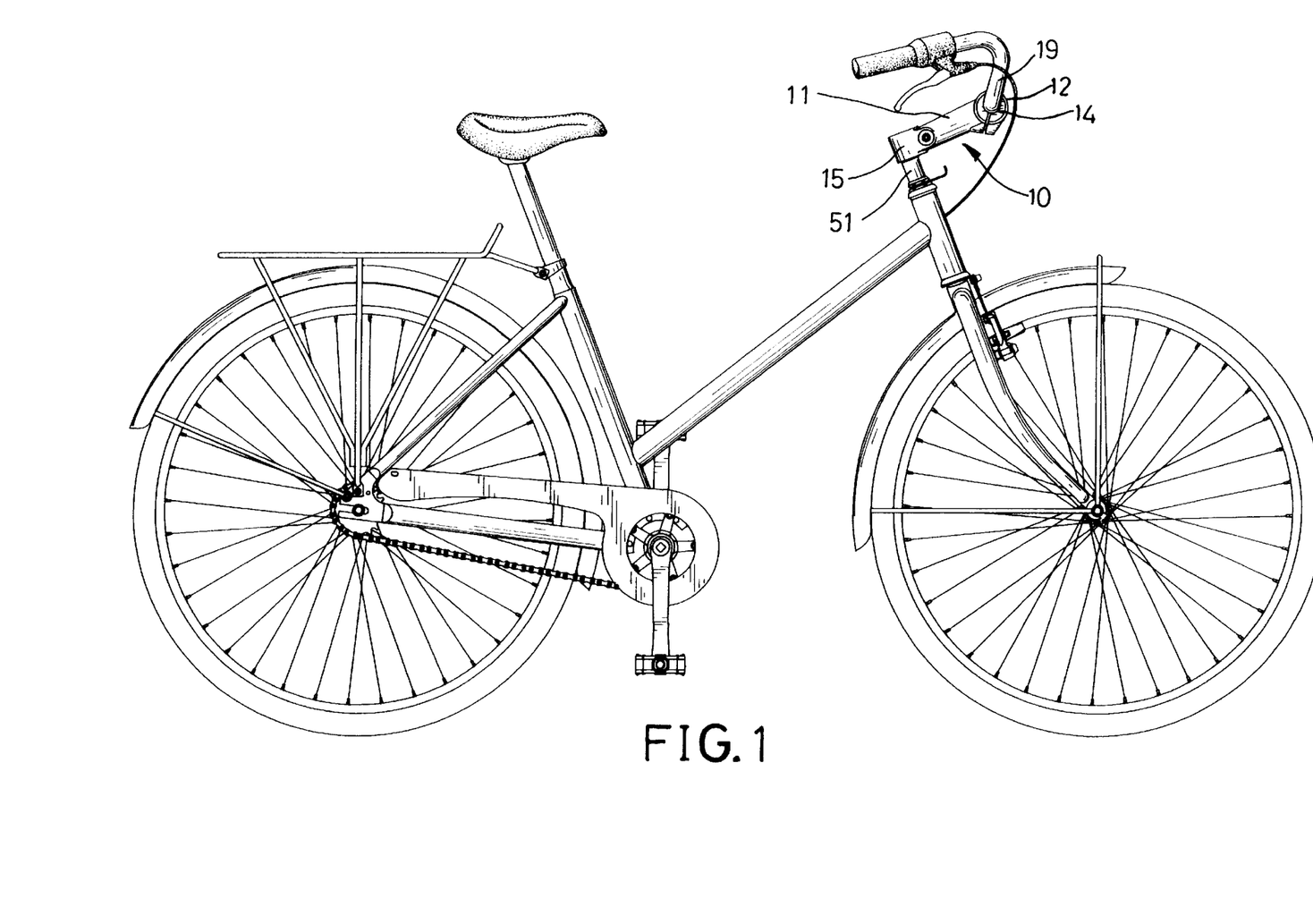
FIG. 1 is a front plan view of a bicycle with a handlebar stem assembly according to the present invention, fitted thereto.
Figure 2:
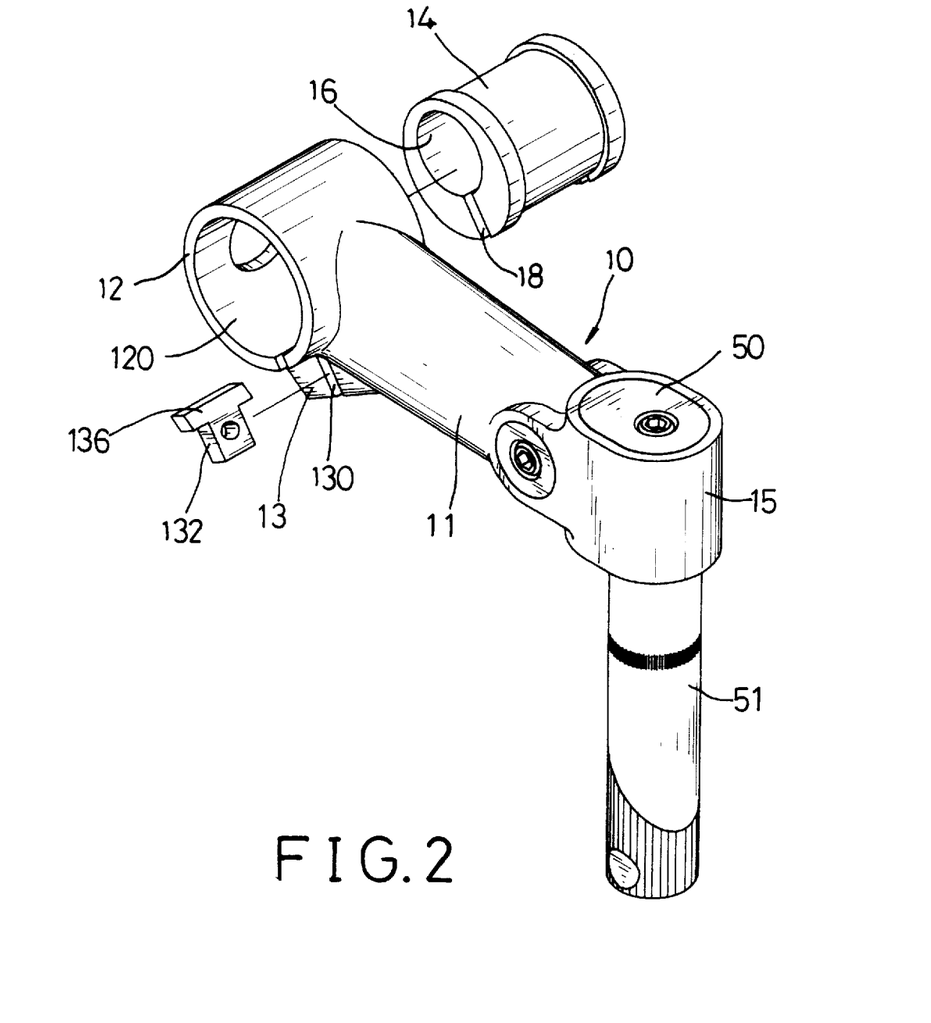
FIG. 2 is an exploded view of a handlebar stem assembly according to a first embodiment of the present invention.
Figure 3:
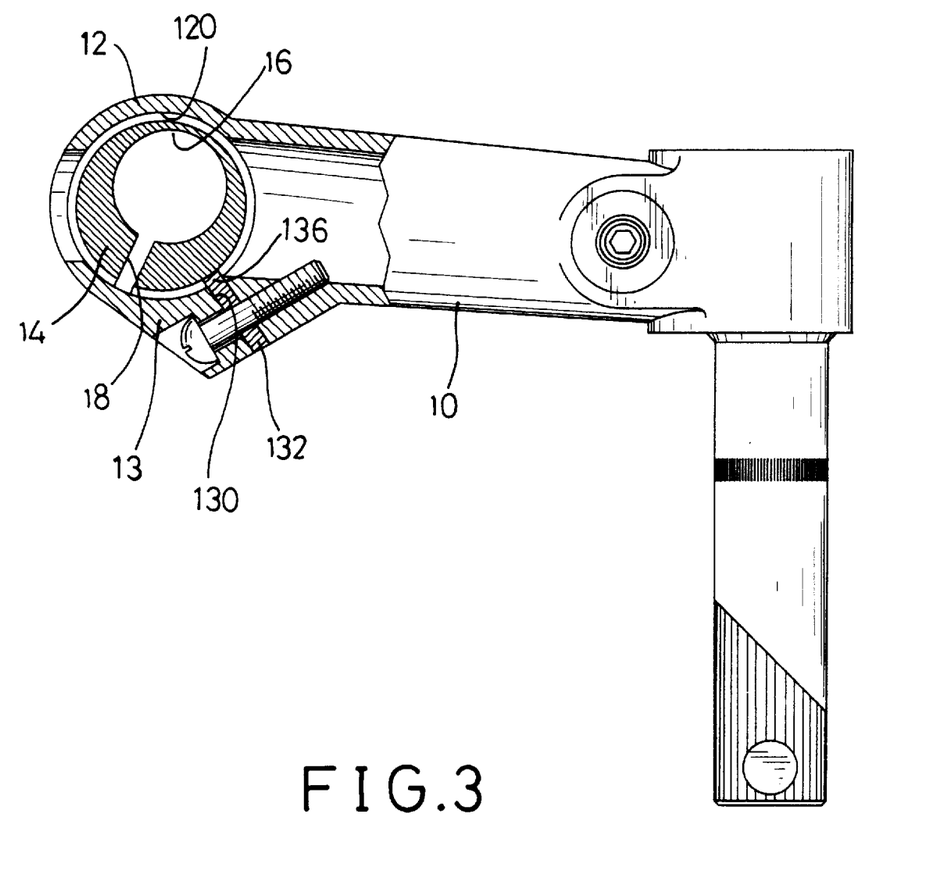
FIG. 3 is a front plan partially cross-sectional assembly view of FIG. 2.

Referring now to FIGS. 1–3, a handlebar stem assembly 10 according to a first embodiment of the present invention can be provided for adjusting the position of a handlebar 19 of a bicycle.

The handlebar stem assembly 10 includes a handlebar stem 11, a tubular housing 12 formed on one end portion of the handlebar stem 11, a passage 120 transversely defined in the tubular housing 12, and an adjusting member rotatably mounted in the passage 120 such that the handlebar 19 can be eccentrically mounted in the adjusting member.

The adjusting member includes an adjusting cylinder 14 rotatably mounted in the passage 120 of the tubular housing 12, and a hole 16 eccentrically defined in the adjusting cylinder 14 for rotatably receiving the handlebar 19.

A cutout 18 is defined in a periphery of the adjusting cylinder 14 and communicates with the hole 16.

An extension 13 is formed on an underside of the tubular housing 12, and has a slit 130 defined therein and communicating with the passage 120. An urging member 132 is fixedly mounted in the slit 130 and has a head 136 extending into the passage 120 and urged on an outer wall of the adjusting cylinder 14.

Figure 4:
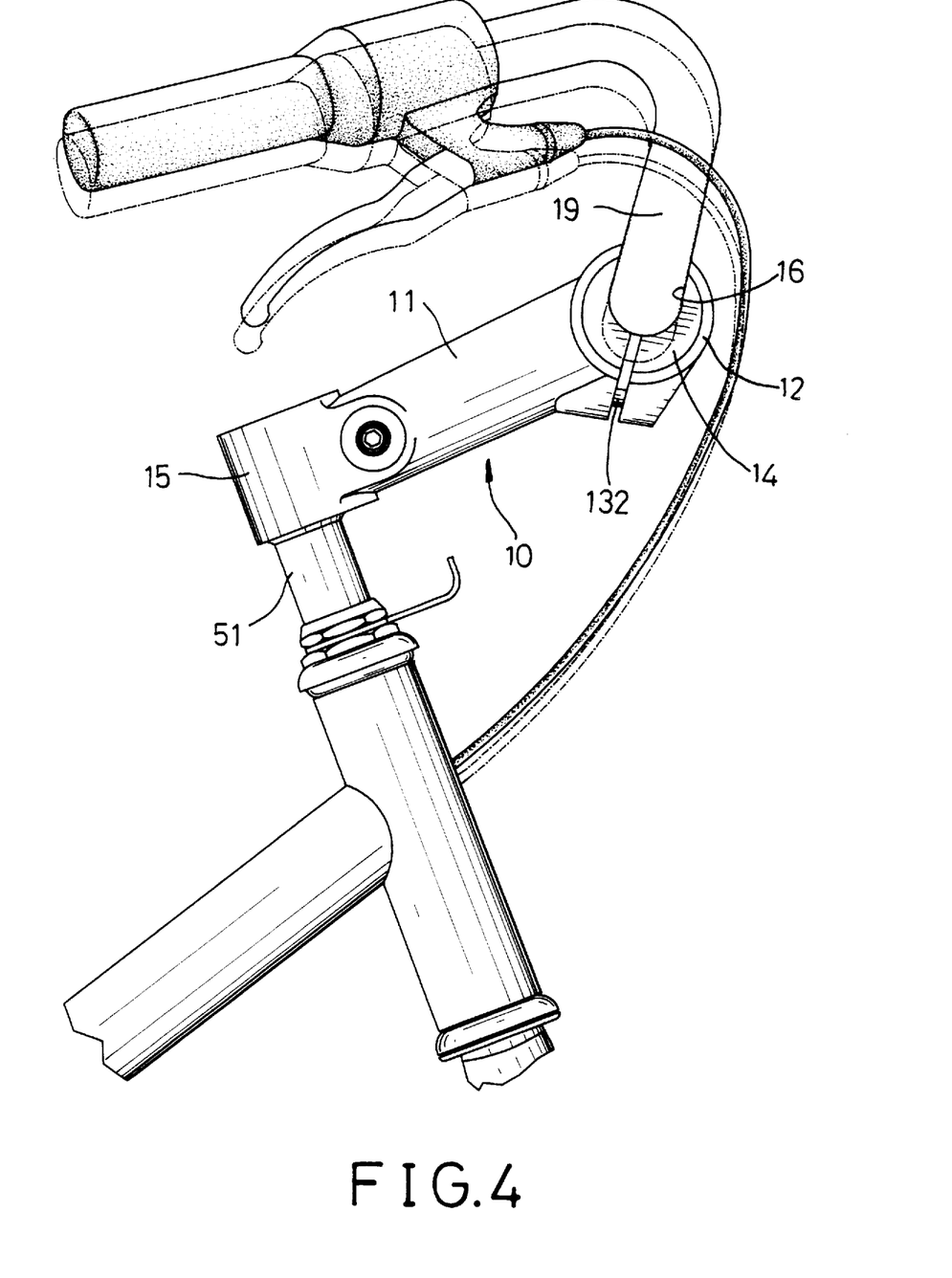
FIG. 4 is an operational view of FIG. 1.

In operation, referring to FIGS. 3 and 4 with reference to FIGS. 1 and 2, the adjusting cylinder 14 can be rotated in the passage 120 of the tubular housing 12 relative to the handlebar 19 when the head 136 of the urging member 132 is not urged on the adjusting cylinder 14.

The handlebar 19 can then be moved by the adjusting cylinder 14 during rotation such that the position of the handlebar 19 relative to the handlebar stem 11 can be freely adjusted due the eccentric action of the adjusting cylinder 14 on the handlebar 19.

By such an arrangement, the height and position of the handlebar 19 can be adapted to be suitable for users of different stature.

Figure 5:
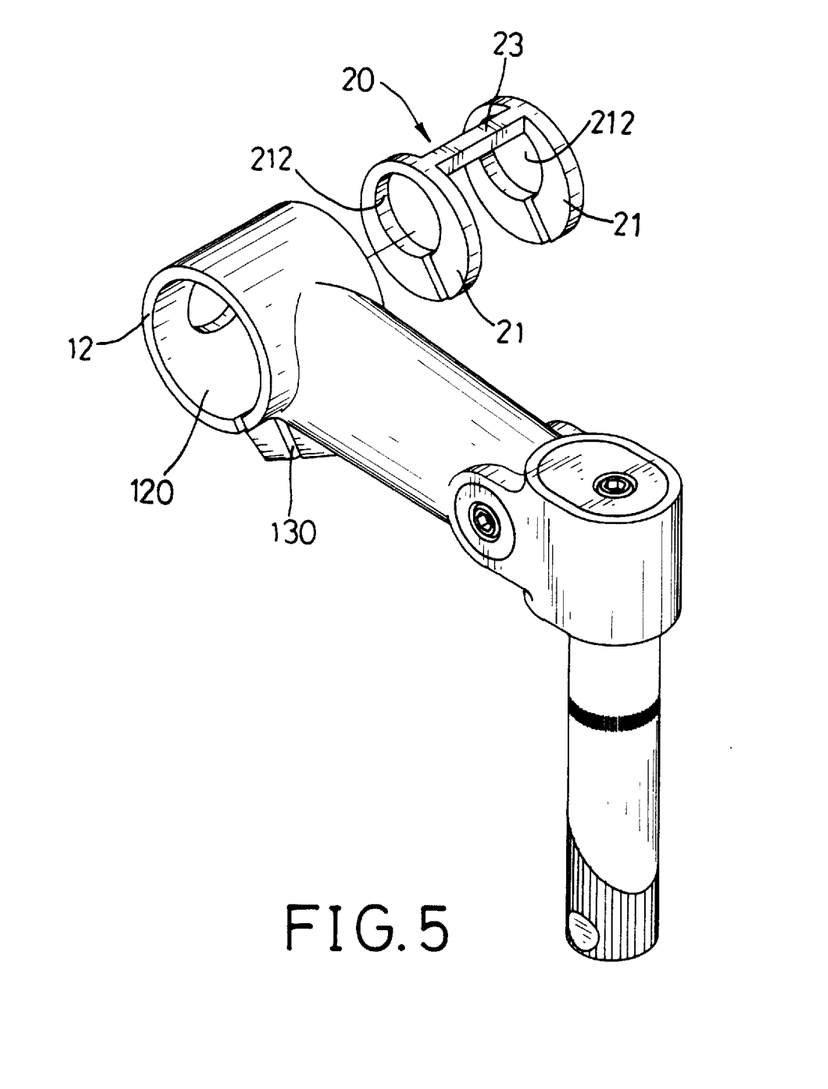
FIG. 5 is an exploded view of a handlebar stem assembly according to a second embodiment of the present invention.

Referring now to FIG. 5, in accordance with a second embodiment of the present invention, the adjusting member includes two disk-shaped pieces 21 each rotatably mounted in the passage 120 and each having a hole 212 eccentrically defined therein for rotatably receiving the handlebar 19, and a connecting rib 23 integrally connected between the two pieces 21.

Figure 6:
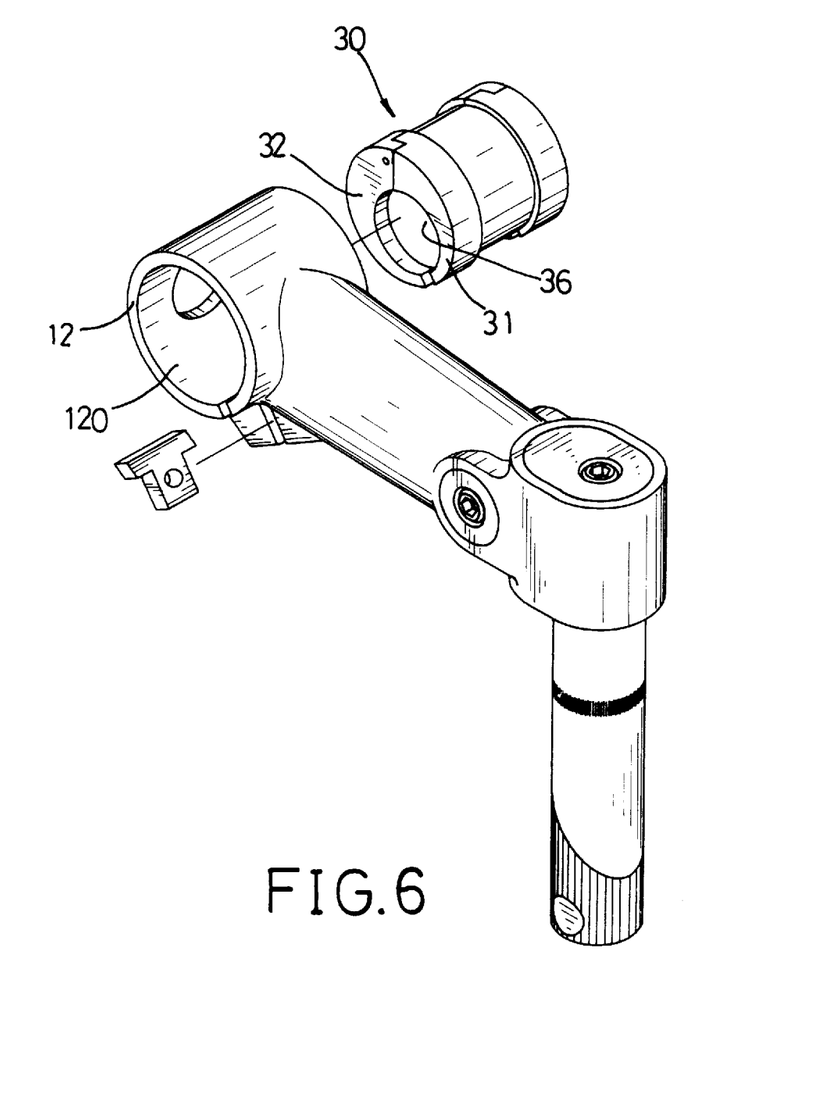
FIG. 6 is an exploded view of a handlebar stem assembly according to a third embodiment of the present invention.

Referring now to FIG. 6, in accordance with a third embodiment of the present invention, the adjusting member includes an adjusting cylinder 30 rotatably mounted in the passage 120.

The cylinder 30 consists of a first semi-cylindrical body 31 and a second semi-cylindrical body 32 pivotally engaged with each other, and a hole 36 eccentrically defined in the cylinder 30 between the first semi-cylindrical body 31 and the second semi-cylindrical body 32 for rotatably receiving the handlebar 19.

Figure 7:
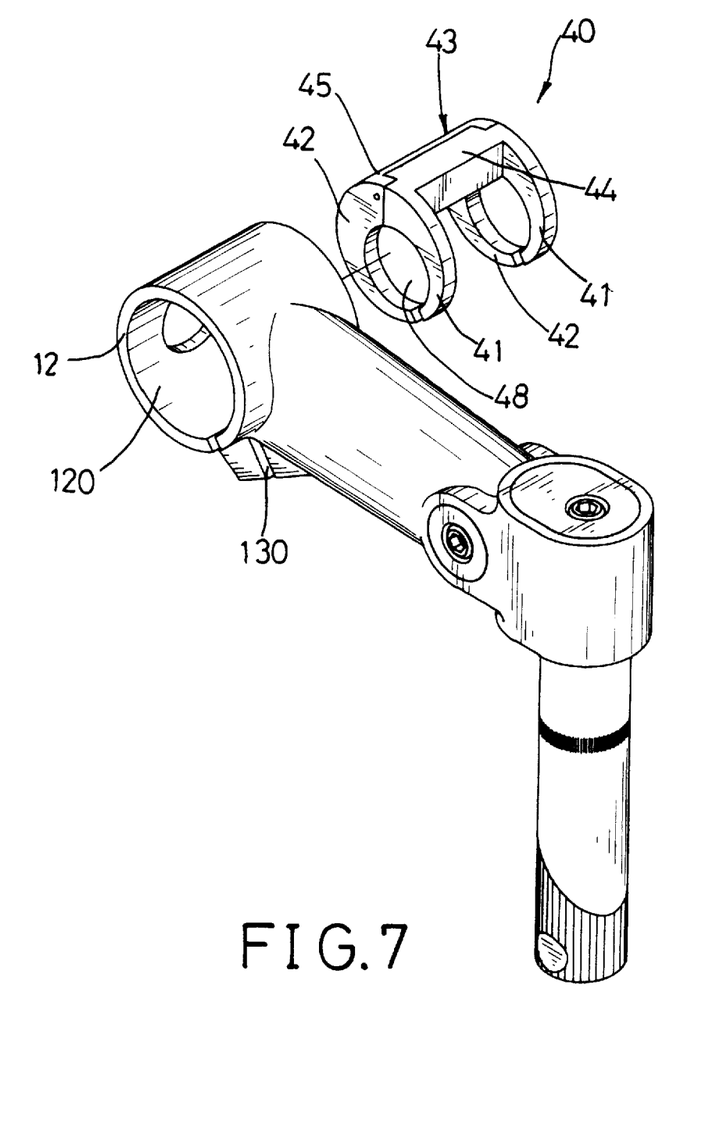
FIG. 7 is an exploded view of a handlebar stem assembly according to a fourth embodiment of the present invention.

Referring now to FIG. 7, in accordance with a fourth embodiment of the present invention, the adjusting member includes two disk-shaped pieces 40 each rotatably mounted in the passage 120, and a connecting rib 43 integrally connected between the two disk-shaped pieces 40.

Each of the two disk-shaped pieces 40 consists of a first semi-cylindrical body 41 and a second semi-cylindrical body 42 pivotally engaged with each other, and a hole 48 eccentrically defined in each of the two disk-shaped pieces 40 between the first semi-cylindrical body 41 and the second semi-cylindrical body 42 for rotatably receiving therein the handlebar 19.

The connecting rib 43 consists of a first rib 44 and a second rib 45 pivotally engaged with each other, wherein the first rib 44 is integrally connected between the two first semi-cylindrical bodies 41, and the second rib 45 is integrally connected between the two second semi-cylindrical bodies 42.

Figure 8:
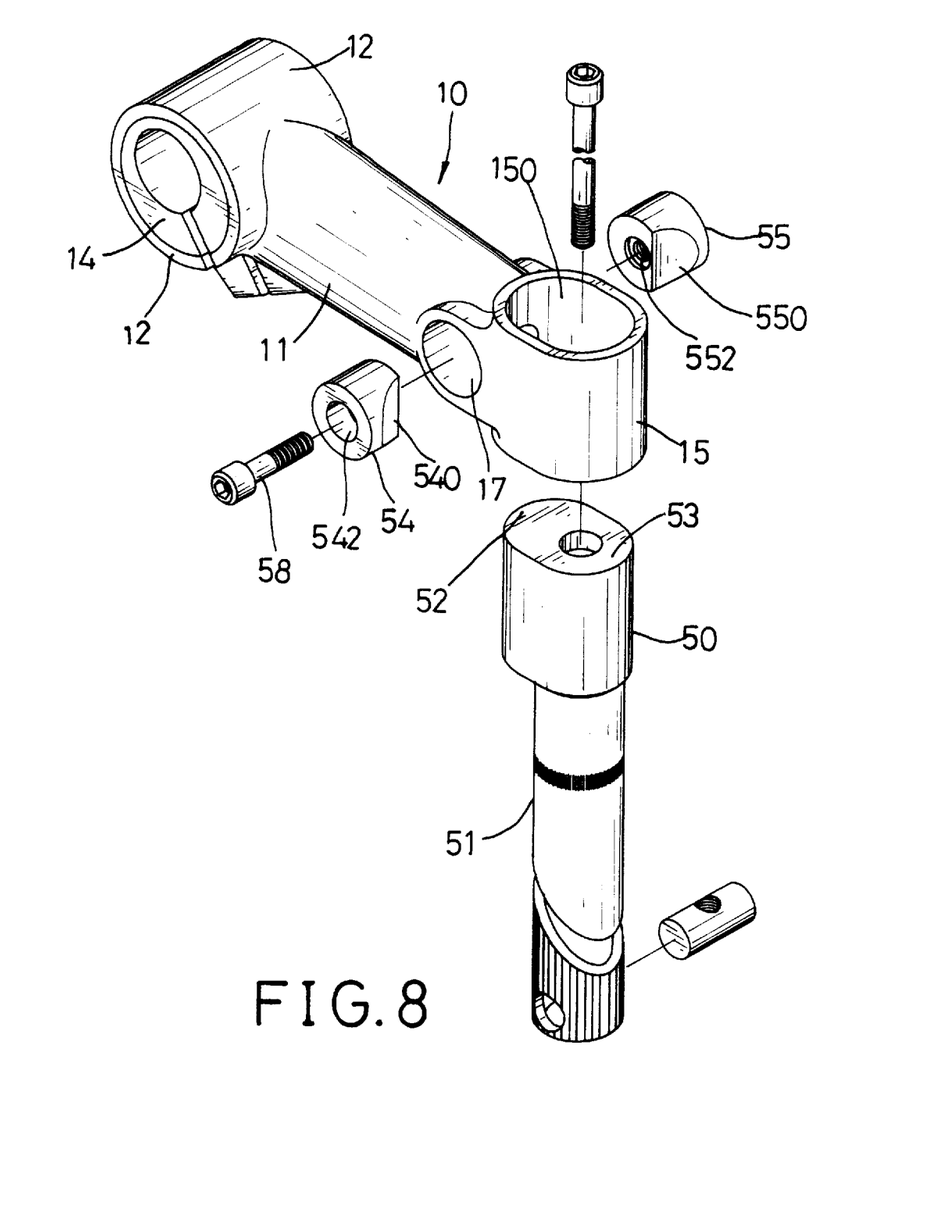
FIG. 8 is an exploded view of a handlebar stem assembly according to a fifth embodiment of the present invention.
Figure 9:
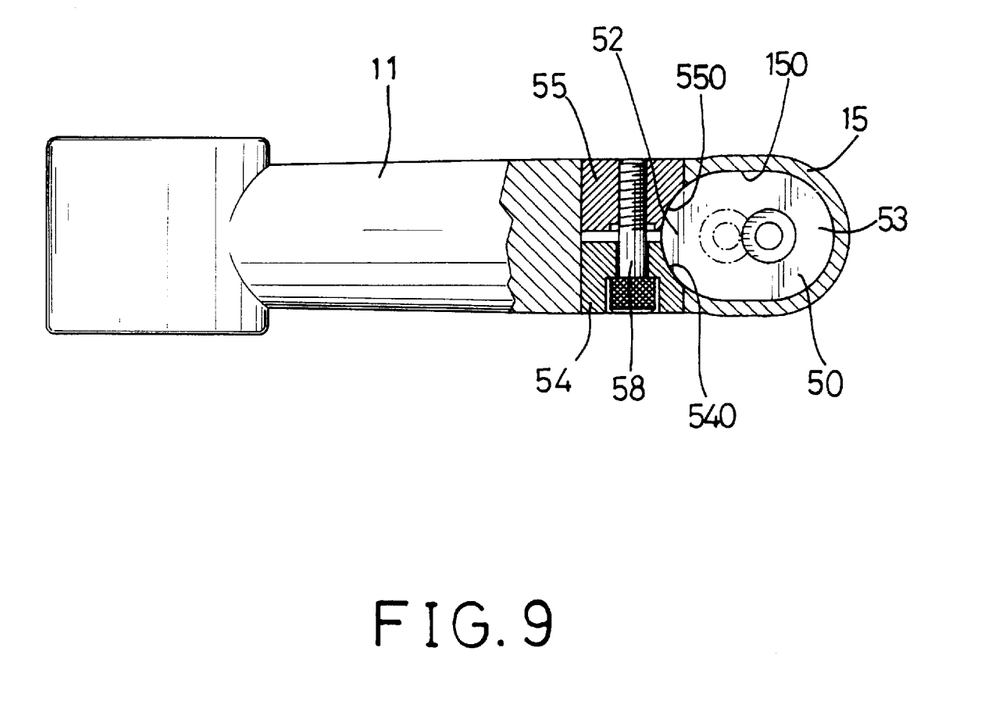
FIG. 9 is a top plan partially cross-sectional assembly view of FIG. 8.

Referring now to FIGS. 8 and 9 with reference to FIG. 1, a handlebar stem assembly 10 in accordance with a fifth embodiment of the present invention can be provided for adjusting the position of a steerer tube 51 of a bicycle.

The handlebar stem assembly 10 comprises a handlebar stem 11, a housing 15 formed on one end portion of the handlebar stem 11, an oblong passage 150 vertically defined in an inner wall of the housing 15, and an oblong adjusting block 50 securely received in the oblong passage 150 and eccentrically mounted on an upper portion of the steerer tube 51.

The oblong adjusting block 50 can be integrally formed on the upper portion of the steerer tube 51.

A hole 17 is transversely defined in the one end portion of the handlebar stem 11 and communicates with the oblong passage 150. The oblong adjusting block 50 has a first arcuate rim 52 partially received in the hole 17 and a second arcuate rim 53 located opposite to the first arcuate rim 52.

A first urging block 54 is received in the hole 17 and securely urged on a first side of the first arcuate rim 52, and a second urging block 55 is received in the hole 17 and securely urged on a second side of the first arcuate rim 52.

The first urging block 54 has an arcuate chamfered surface 540 abutting the first side of the first arcuate rim 52 of the adjusting block 50, and the second urging block 55 has an arcuate chamfered surface 550 abutting the second side of the first arcuate rim 52 of the adjusting block 50.

The first urging block 54 has a bore 542 defined therein, the second urging block 55 has a threaded bore 552 defined therein, and a positioning bolt 58 extends through the bore 542 and the threaded bore 552, thereby securing the first urging block 54 and the second urging block 55.

In operation, the adjusting block 50 is initially received in the passage 150 with the first arcuate rim 52 being urged by the first and second urging blocks 54 and 55 as shown in FIG. 9.

The adjusting block 50 can then be released from the passage 150 when the first and second urging blocks 54 and 55 are detached from the positioning bolt 58.

The adjusting block 50 can then be rotated through 180 degrees and can be inserted into the passage 150 again with the second arcuate rim 53 being partially received in the hole 17 and urged by the first and second urging blocks 54 and 55.

By such an arrangement, the position of the steerer tube 51 relative to the housing 15 can be changed due to the eccentrical action of the adjusting block 50, thereby easily adjusting the position of the steerer tube 51 relative to the handlebar 19 as shown in FIG. 1.

Figure 10:
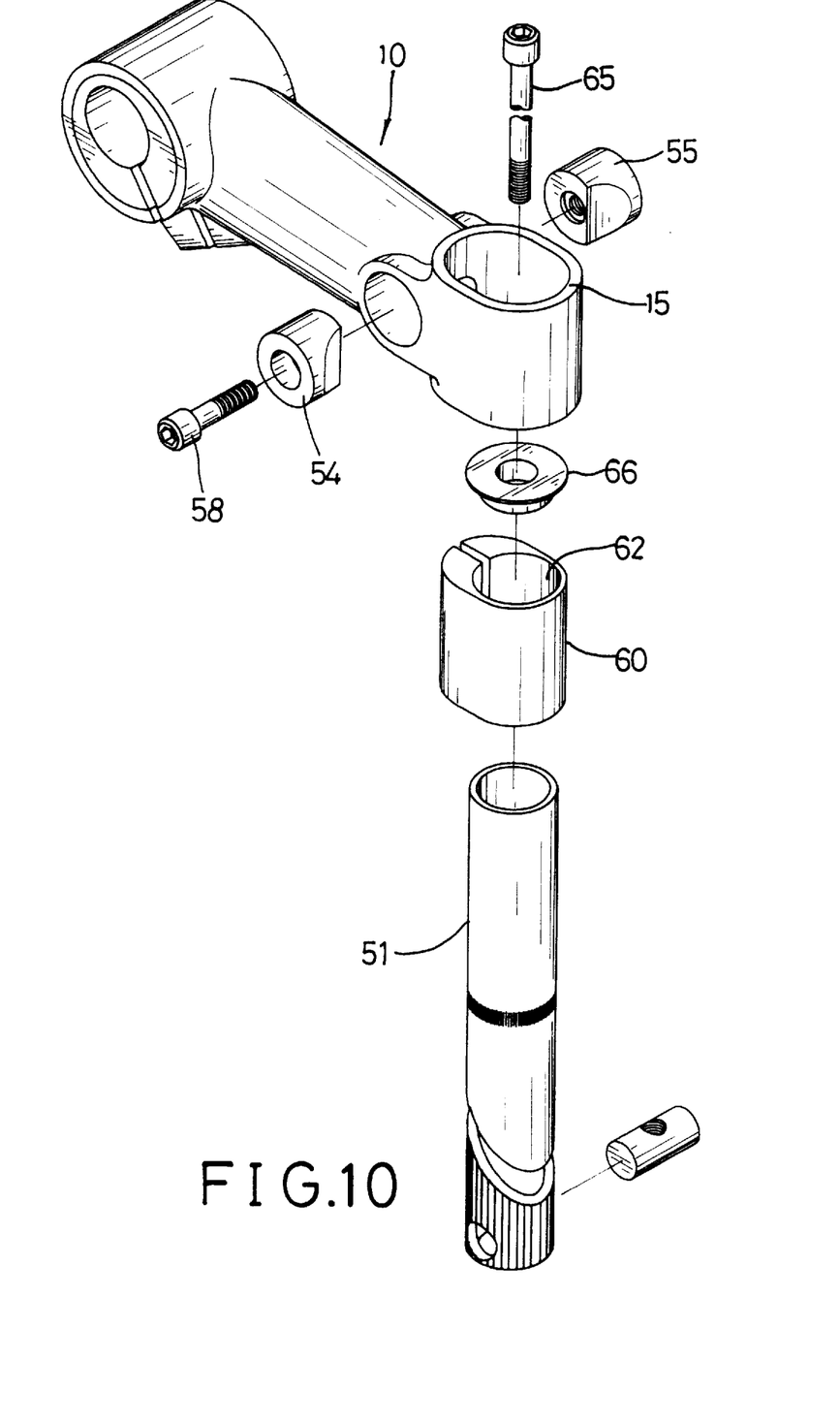
FIG. 10 is an exploded view of a handlebar stem assembly according to a sixth embodiment of the present invention.

Referring now to FIG. 10, in accordance with a sixth embodiment of the present invention, an adjusting block 60 has a hole 62 eccentrically defined therein for receiving the upper portion of the steerer tube 51. A cap 66 is fitted on an upper portion of the adjusting block 60, and a positioning bolt 65 extends through the cap 66 and is threadedly received in a threaded peg transversely received in the steerer tube 51, thereby securing the adjusting block 60 on the upper portion of the steerer tube 51.

It should be clear to those skilled in the art that further embodiments of the present invention may be made without departing from the spirit and scope of the present invention.

What is claimed is:

1. A handlebar stem assembly in combination with a handlebar of a bicycle and comprising:

a handlebar stem, a tubular housing formed on one end portion of said handlebar stem, a passage transversely defined in an inner wall of said tubular housing, an extension formed on an outer wall of said tubular housing and defining a slit communicating with said passage;

an adjusting member rotatably mounted in said passage, said handlebar eccentrically mounted in said adjusting member, said adjusting member including a cylinder rotatably mounted in said passage and eccentrically defining a hole in which said handlebar is rotatably received, said cylinder including a periphery defining a cutout communicating with said hole; and an urging member fixedly mounted in said slit and including a head extending into said passage and pressing the outer wall of said cylinder for fixing said cylinder in said tubular housing.

2. The handlebar stem assembly in accordance with claim 1, wherein said adjusting member includes two disk-shaped pieces (21) each rotatably mounted in said passage (120) and each having a hole (212) eccentrically defined therein for rotatably receiving said handlebar (19), and a connecting rib (23) connected between said two pieces (21).

3. The handlebar stem assembly in accordance with claim 1, wherein said adjusting member includes a cylinder (30) rotatably mounted in said passage (120), said cylinder (30) consisting of a first semi-cylindrical body (31) and a second semi-cylindrical body (32) pivotally engaged with each other, and a hole (36) eccentrically defined in said cylinder (30) between said first semi-cylindrical body (31) and said second semi-cylindrical body (32) for rotatably receiving said handlebar (19).

4. The handlebar stem assembly in accordance with claim 1, wherein said adjusting member includes two disk-shaped pieces (40) each rotatably mounted in said passage (120), and a connecting rib (43) connected between said two disk-shaped pieces (40), each of said two disk-shaped pieces (40) consisting of a first semi-cylindrical body (41) and a second semi-cylindrical body (42) pivotally engaged with each other, and a hole (48) eccentrically defined in each of said two disk-shaped pieces (40) between said first semi-cylindrical body (41) and said second semi-cylindrical body (42) for rotatably receiving said handlebar (19), said connecting rib (43) consisting of a first rib (44) and a second rib (45) pivotally engaged with each other, said first rib (44) connected between each of said two first semi-cylindrical bodies (41), said second rib (45) connected between each of said two second semi-cylindrical bodies (42).

* * * * *